J. L. WILLIAMS.
COTTON PRESS.
No. 261,116. Patented July 11, 1882.
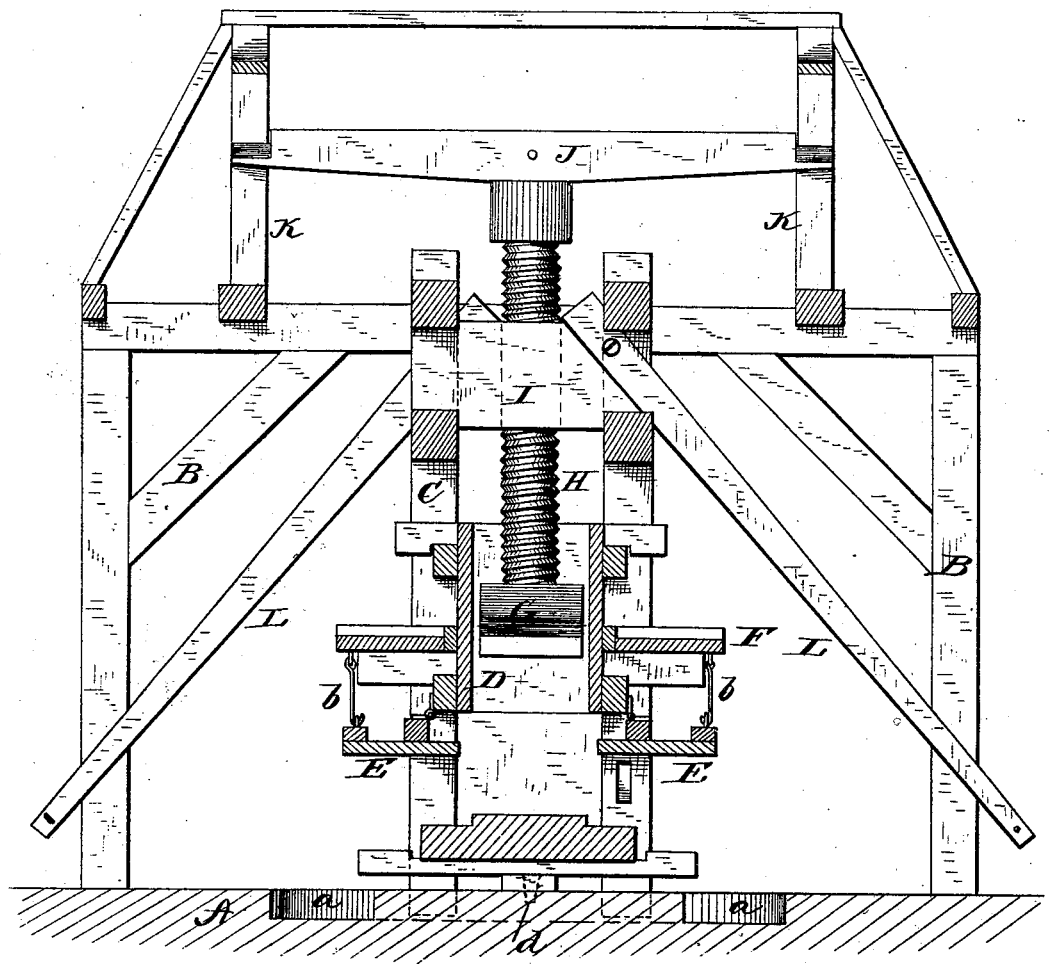
WITNESSES
Franck L. Ouraud
H. Aubrey Toulmin
INVENTOR
James L. Williams.
Alexander Mason
ATTORNEYS

UNITED STATES PATENT OFFICE.

JAMES L. WILLIAMS, OF HUNTSVILLE, ASSIGNOR OF ONE-HALF TO NATHAN PITTMANN, OF LODI, MISSISSIPPI.

COTTON-PRESS.

SPECIFICATION forming part of Letters Patent No. 261,116, dated July 11, 1882.

Application filed September 26, 1879.

*To all whom it may concern:*

Be it known that I, JAMES L. WILLIAMS, of Huntsville, in the county of Montgomery, and in the State of Mississippi, have invented certain new and useful Improvements in Cotton-Presses; and I do hereby declare that the following is a full, clear, and exact description thereof, reference being had to the accompanying drawing, and to the letters of reference marked thereon, making a part of this specification.

The nature of my invention consists in the construction and arrangement of a cotton-press, as will be hereinafter more fully set forth.

The annexed drawing represents a vertical section of my cotton-press.

A represents the ground on which the main frame B is erected.

*a* is a circular ditch, in which move the lower ends of the posts for the frame containing the cotton-box.

C represents the frame in which the cotton-box D is made, said box being at the bottom provided with doors E for taking out the bale. When the doors are closed they may be fastened by bars or other suitable means, and when opened they are suspended by hooks *b* from a platform, F, surrounding the frame C. This platform is at such a height as will be convenient for putting the cotton into the box at the top. The entire frame C, with box D, rests on a center pivot, *d*, so as to turn on the same.

G is the follower swiveled to the lower end of a screw, H, which passes through a nut, I, strongly secured at the top of the frame C. The upper end of the screw H is firmly secured to a horizontal guide, J, having vertical movement, the ends of which are forked and straddle upright posts K K on the main frame B, so as to prevent the screw from turning.

L L are levers attached to the frame C, for turning the same.

By turning the frame and box C D in one direction the screw H will be run up until the follower G is entirely out of the bale-box and sufficient room given for putting in the cotton. After the desired quantity is put in the frame and box are turned in the opposite direction, when the follower will descend and pack the bale. When suitably pressed the doors E are opened, the bale-bands tied, and the bale removed.

Having thus fully described my invention, what I claim as new, and desire to secure by Letters Patent, is—

1. In a cotton-press, the combination of the upright horizontally-rotary frame C, provided with a press-box and a nut, I, the screw H, the follower G on the lower end of this screw, the guide-bar J at the upper end thereof, the platform F, secured to and movable with the press-frame and arranged below the upper end of the press-box, and the sweeps L, secured rigidly and directly to the nut I, all substantially as and for the purposes described.

2. The combination of an upright horizontally-rotating frame, C, a platform, F, secured to the same below the top of the press-box and provided with suspension-hooks *b*, and the hinged doors E, provided with eyes to receive said hooks when the doors are raised, substantially as described.

In testimony that I claim the foregoing I have hereunto set my hand and seal this 7th day of July, 1879.

JAMES LEMUEL WILLIAMS. [L. S.]

Witnesses:
 CHARLES MCCORMIC,
 ROUCH GUESS.